(12) United States Patent  
Kimmig et al.

(10) Patent No.: US 8,596,441 B2  
(45) Date of Patent: Dec. 3, 2013

(54) CLUTCH ASSEMBLY

(75) Inventors: Karl-Ludwig Kimmig, Ottenhoefen (DE); Andreas Ruehle, Stuttgart (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 222 days.

(21) Appl. No.: 13/056,158

(22) PCT Filed: Jul. 13, 2009

(86) PCT No.: PCT/DE2009/000965  
§ 371 (c)(1),  
(2), (4) Date: Jan. 27, 2011

(87) PCT Pub. No.: WO2010/012258  
PCT Pub. Date: Feb. 4, 2010

(65) Prior Publication Data  
US 2011/0132715 A1    Jun. 9, 2011

(30) Foreign Application Priority Data  
Jul. 28, 2008    (DE) .......................... 10 2008 035 143

(51) Int. Cl.  
*F16D 13/70* (2006.01)  
*F16D 21/06* (2006.01)

(52) U.S. Cl.  
USPC .................................. 192/107 R; 192/109 A

(58) Field of Classification Search  
USPC ....................... 192/48.1, 48.8, 48.9  
See application file for complete search history.

(56) References Cited

U.S. PATENT DOCUMENTS

| 2,321,672 | A | * | 6/1943 | Hall et al. ................... 74/336 R |
| 2,485,688 | A | * | 10/1949 | Banker .................... 192/48.609 |
| 3,129,794 | A | * | 4/1964 | Altmann et al. .............. 477/175 |
| 4,026,400 | A | * | 5/1977 | Rawlings ................... 192/99 A |
| 4,044,869 | A | * | 8/1977 | Gros .......................... 192/48.91 |
| 4,724,942 | A |   | 2/1988 | Casse et al. |
| 4,729,464 | A | * | 3/1988 | Friedmann ................. 192/70.17 |
| 2004/0045782 | A1 | * | 3/2004 | Tornatore et al. ............ 192/48.9 |
| 2006/0289263 | A1 | * | 12/2006 | Friedmann et al. .......... 192/48.8 |

FOREIGN PATENT DOCUMENTS

| EP | 1 617 096 A | 1/2006 |
| EP | 2 028 384 A | 2/2009 |
| FR | 2 583 479 A | 12/1986 |

* cited by examiner

*Primary Examiner* — David D Le  
*Assistant Examiner* — Mark Manley  
(74) *Attorney, Agent, or Firm* — Lucas & Mercanti, LLP

(57) ABSTRACT

The invention relates to a clutch assembly, comprising at least one friction clutch (8, 9), which includes a clutch disk (21, 22) with friction linings (18, 19) that can be clamped between two pressure plates (14, 15, 16). The invention is characterized in that at least one of the pressure plates has a collar (30), which encloses the friction linings radially on the outside at least in some regions.

9 Claims, 1 Drawing Sheet

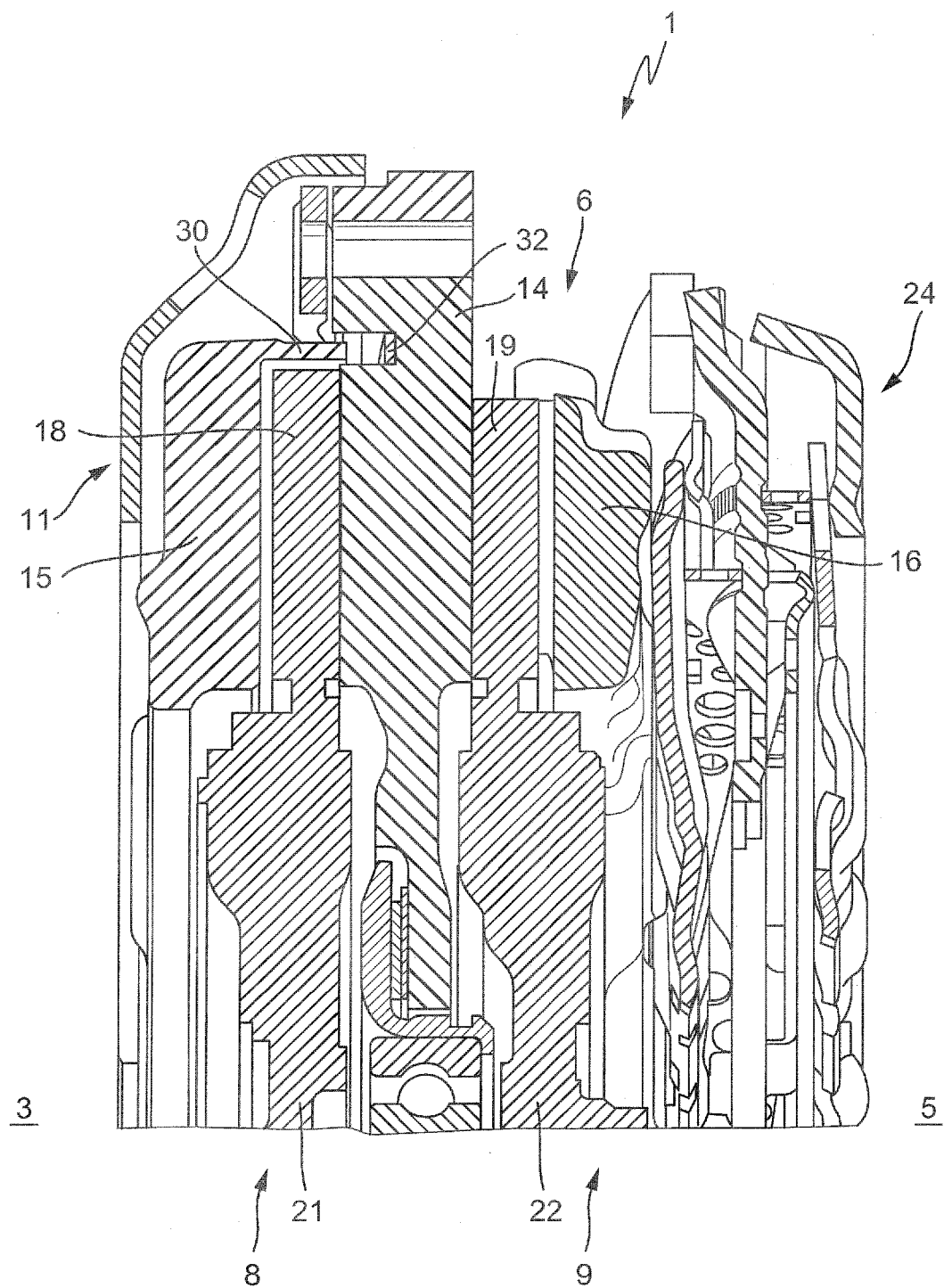

CLUTCH ASSEMBLY

This application is a 371 of PCT/DE2009/000965 filed Jul. 13, 2009, which in turn claims the priority DE 10 2008 035 143.1 filed Jul. 28, 2008, the priority of these applications is hereby claimed and these applications are incorporated by reference herein.

The invention relates to a clutch assembly with at least a friction clutch that comprises a clutch disk with friction linings that can be clamped between two pressure plates.

It is the objective of the invention to create a clutch assembly in accordance with the introductory portion of Claim 1, which is simple in design and has long service life potential.

The objective is met with a clutch assembly having at least a friction clutch that comprises a clutch disk with friction linings that can be clamped between two pressure plates, in that at least one of the pressure plates comprises a collar that surrounds the friction linings radially outside, at least partially. The terms "axial" and "radial" in the scope of this text refer to the axis of rotation of the clutch disk. Axial implies in the direction of or parallel to the axis of rotation of the torsional vibration damper. The clutch assembly serves for torque transmission between a drive unit, particularly an internal combustion engine with a drive shaft, particularly crankshaft, and transmission with at least a transmission input shaft. A torsional vibration damper can be connected between the drive shaft of the drive unit and the friction clutch. The friction clutch is executed preferably as a double clutch. In the investigations conducted within the scope of this invention it was found out that because of fabrication tolerances and/or influences in operation, such as high temperatures and/or high speeds, a so-called burst speed of the clutch disk could be exceeded significantly. It is possible to improve the friction linings so that they endure higher burst speeds. The collar in accordance with this invention achieves burst safety in a simple manner for the friction linings of the clutch disk, without the friction linings having to be changed. The collar prevents material detached from the linings uncontrolled outward motion under centrifugal force.

A preferred exemplary embodiment of the clutch assembly is one in which the collar and the corresponding pressure plate are combined to form a single part. The collar extends in axial direction preferably from a radial external edge section of the pressure plate.

A further preferred exemplary embodiment of the clutch assembly is one, in which the pressure plate is executed with the collar as cast part. Preferably, the collar has the shape of a circular cylindrical jacket that surrounds the friction linings of the clutch disk.

Yet another preferred exemplary embodiment of the clutch assembly is one, in which the collar is executed as a separate component fixed on the corresponding pressure plate. In this exemplary embodiment, the collar is formed preferably on a sheet metal part fixed, for example, with the help of elements riveted on the pressure plate.

Still a further preferred exemplary embodiment of the clutch assembly is one, in which, the collar extends away in axial direction from the pressure plate. The collar has essentially the shape of a straight circular cylindrical jacket that extends radially outside the pressure plate and is disposed coaxially to the axis of rotation of the clutch disk.

A further preferred exemplary embodiment of the clutch assembly is one, in which the pressure plate, opposite the pressure plate with the collar, comprises a groove in the axial end area of the collar. The groove mainly serves to prevent the collar from touching the opposite pressure plate, which could lead to undesirable wear or damage of the collar and/or opposite pressure plate.

Yet another preferred exemplary embodiment of the clutch assembly is one, in which the collar partially engages the groove. Thereby, it is essential that the collar remains at least slightly at a distance from the opposite pressure plate in order to prevent undesirable contact between the collar and the opposite pressure plate. Through the engagement of the collar with the groove, detached lining parts are prevented from escaping or flying away radially outwards under centrifugal force.

Still a further preferred exemplary embodiment of the clutch assembly is one, in which the groove is formed as a ring groove with a cross-section that is open towards the collar. The dimensions of the groove in any case are somewhat larger than the corresponding dimensions of the collar in order to prevent the collar from touching groove flanks or the groove root.

A further preferred exemplary embodiment of the clutch assembly is one, in which, the groove is formed with an essentially rectangular cross-section. The dimensions of the groove are selected such that the collar can move into the groove, when the pressure plate also designated as pressure plate, with the collar, is moved towards the opposite pressure plate.

Yet another preferred exemplary embodiment of the clutch assembly is one, in which the clutch assembly comprises a double clutch with two clutch disks with friction linings that can be clamped between a central pressure plate and two pressure plates, which are limitedly displaceable in axial direction relative to the central pressure plate. The collar is preferably provided at least on one of the limitedly displaceable pressure plates. At least one groove is preferably provided on the central pressure plate.

Further advantages, comprises and details of the invention are derivable from the following description, in which an exemplary embodiment is described in detail with reference to the drawing.

In the attached FIG. 1, an exemplary embodiment of a clutch assembly in accordance with the invention is depicted in half section.

In FIG. 1, a part of a drive train 1 of a motor vehicle is depicted in half-section. Between a drive unit 3 indicated only by a reference sign, particularly of an internal combustion engine, from which a crankshaft originates, and the transmission 5 is only indicated by a reference sign, a double clutch 6 is disposed. Between the drive unit 3 and the double clutch 6, a torsional vibration-damping device can be connected. The double clutch 6 comprises a first friction clutch 8 and a second friction clutch 9.

An input part 11 of the double clutch 6 is connected non-rotatably with the crankshaft of the drive unit. Via the input part 11, torque is introduced from the drive unit 3 into a central pressure plate 14 that is designated also as a pressure disk and is connected non-rotatably with the input part 11. The first friction clutch 8 comprises a first pressure plate 15 that is limitedly displaceable in axial direction relative to the central pressure plate 14. By analogy, the second friction clutch 9 comprises a second pressure plate 16 that is also limitedly displaceable in axial direction relative to the central pressure plate 14.

In axial direction between the first pressure plate 15 and the central pressure plate 14, friction linings 18 of a first clutch disk 21 can be clamped. The first clutch disk 21 is connected non-rotatably, if necessary with an interposed torsional vibration damper, with a first transmission input shaft of the transmission 5. Between the second pressure plate 16 and the central pressure plate 14, friction linings 19 of a second clutch disk 22 can be clamped non-rotatably, if necessary with an interposed torsional vibration damper, with a second transmission input shaft of the transmission 5. Both pressure plates 15, 16 are actuated by means of an actuating device 24 that comprises for example diaphragm springs and a wear adjustment device, that moves in axial direction towards the central pressure plate 14.

Based on fabrication tolerances and influences during operation, a so-called burst speed of the clutch disks 21, 22 can be exceeded significantly. At burst speed, parts of the friction linings 18, 19 detach and can move outwards uncontrolled, owing to the centrifugal force prevailing during operation. Such lining parts can lead to jamming of other components of the clutch assembly. Particularly in double clutch applications, high demands are put on the burst speed of friction linings 18, 19. In normal operation of a double clutch, one clutch is always open. The clutch disk of this open clutch is subject to very high speeds in such a situation, depending on the selected gear. Upon bursting of friction linings, detached lining parts can jam with cams of the pressure plates, which lead to higher torque due to form-closure between clutch and engine.

In accordance with an essential aspect of the invention, jamming of lining material is prevented by means of a collar 30 that is provided, in this example, on the first pressure plate 15. Alternatively, the collar can be provided also on the central pressure plate 14. The collar 30 has the shape of a circular cylindrical jacket and it is connected with the first pressure plate 15 as one piece. The collar 30 extends in axial direction radially outside the friction linings 18 of the first clutch disk 21. The free end of the collar 30 projects in a groove 32 provided as ring groove in the central pressure plate 14. The groove 32 is rectangular in cross-section and it is dimensioned such that the collar 30 can be moved into the groove 32 during movement of the first pressure plate 15 towards the central pressure plate 14. Alternatively, the collar 30 can be provided also as a separate sheet metal part, which again is fixed on the pressure plate 15.

Through the collar 30, detached lining parts of the friction linings 18 are prevented from wandering out. Through this, undesirable form-closure between the clutch disk 21 and the input part 11 can be prevented. Therefore, in comparison with conventional clutch assemblies, for a burst friction lining significantly lower drag torque can be implemented.

The groove 32 on the one hand ensures that the pressure plate 15 of the friction clutch 8 can move freely and on the other hand that it does not stick on the central pressure plate 14 when engaging the friction clutch 8 and during the wearing process. The collar 30 can be used moreover as wear limit stop. The ring-shaped collar 30 certainly prevents detached lining parts from wandering from inside outwards. If the collar is executed as separate sheet metal part, it is considerable to use a stronger material for the collar than for the pressure plate.

LIST OF REFERENCE SYMBOLS 1 drive train
3 drive unit
5 transmission
6 double clutch
8 first friction clutch
9 second friction clutch
11 input part
14 central pressure plate
15 first pressure plate
16 second pressure plate
18 friction lining
19 friction lining
21 first clutch disk
22 second clutch disk
24 actuating device
30 collar
32 groove

What we claim is:

1. A clutch assembly with at least a friction clutch that comprises a clutch disk with friction linings, a first pressure plate, and a second pressure plate, the fiction linings can be damped between the first and second pressure plates, at least the first pressure plate comprising a collar that at least partially surrounds the friction lining radial outside, the collar having a shape of a circular cylindrical jacket, wherein the second pressure plate, opposite the first pressure plate with the collar, comprises an axially opening groove facing an axial end of the collar, and wherein the first pressure plate is moveable relative to the second pressure plate into a position in which at least the axial end of the collar extends into the groove.

2. The clutch assembly according to claim 1, wherein the collar and the first pressure plate are connected as one-piece component.

3. The clutch assembly according to claim 2, wherein the first pressure plate and collar are executed as one casting.

4. The clutch assembly according to claim 1, wherein the collar is executed as a separate component fixed on the first pressure plate.

5. The clutch assembly according to claim 1, wherein the collar of the first pressure plate extends in axial direction.

6. The clutch assembly according to claim 1, wherein the groove is formed as a ring groove with open groove cross-section towards the axial end of the collar.

7. The clutch assembly according to claim 1, wherein the groove is essentially rectangular in cross-section.

8. The clutch assembly according to claim 1, wherein the clutch assembly comprises a double clutch with two clutch disks with friction linings that can be damped between a central pressure plate and two outer pressure plates that are limitedly displaceable in axial direction relative to the central pressure plate, wherein the second pressure plate of the at least a friction clutch is the central pressure plate, the first pressure plate of the at least a friction clutch is one of the two outer pressure plates, and the clutch disk of the at least a friction clutch is one of the two clutch disks.

9. The clutch assembly according to claim 1, wherein the groove has a bottom wall and two sidewalls, with the bottom end of the groove facing the axial end of the collar.

* * * * *

UNITED STATES PATENT AND TRADEMARK OFFICE
CERTIFICATE OF CORRECTION

PATENT NO. : 8,596,441 B2  
APPLICATION NO. : 13/056158  
DATED : December 3, 2013  
INVENTOR(S) : Kimmig et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 224 days.

Signed and Sealed this
Twenty-second Day of September, 2015

Michelle K. Lee
*Director of the United States Patent and Trademark Office*